No. 860,706. PATENTED JULY 23, 1907.
E. N. TRUMP.
CONVEYING APPARATUS.
APPLICATION FILED JULY 14, 1896.

WITNESSES:

INVENTOR
Edward N. Trump
BY
ATTORNEYS.

No. 860,706. PATENTED JULY 23, 1907.
E. N. TRUMP.
CONVEYING APPARATUS.
APPLICATION FILED JULY 14, 1896.

WITNESSES:

INVENTOR
Edward N. Trump
BY
ATTORNEYS.

No. 860,706. PATENTED JULY 23, 1907.
E. N. TRUMP.
CONVEYING APPARATUS.
APPLICATION FILED JULY 14, 1896.

WITNESSES:

INVENTOR
Edward N. Trump
BY
Hey & Parsons
ATTORNEYS.

No. 860,706. PATENTED JULY 23, 1907.
E. N. TRUMP.
CONVEYING APPARATUS.
APPLICATION FILED JULY 14, 1896.

WITNESSES:

INVENTOR
Edward N. Trump
BY
ATTORNEYS.

No. 860,706. PATENTED JULY 23, 1907.
E. N. TRUMP.
CONVEYING APPARATUS.
APPLICATION FILED JULY 14, 1896.

WITNESSES:

INVENTOR
Edward N. Trump
BY
Kay + Parsons
ATTORNEYS.

No. 860,706. PATENTED JULY 23, 1907.
E. N. TRUMP.
CONVEYING APPARATUS.
APPLICATION FILED JULY 14, 1896.

WITNESSES:

INVENTOR
Edward N. Trump

BY
ATTORNEYS

UNITED STATES PATENT OFFICE.

EDWARD N. TRUMP, OF SYRACUSE, NEW YORK.

CONVEYING APPARATUS.

No. 860,706.      Specification of Letters Patent.      Patented July 23, 1907.

Application filed July 14, 1896. Serial No. 599,096.

*To all whom it may concern:*

Be it known that I, EDWARD N. TRUMP, of Syracuse, in the county of Onondaga, in the State of New York, have invented new and useful Improvements in Conveying Apparatus, of which the following, taken in connection with the accompanying drawing, is a full, clear, and exact description.

My invention relates to improvements in conveying apparatus and has for its object the production of a device which is capable of feeding material in different directions, and is particularly applicable for cooling or otherwise changing or manipulating the same, and, to this end it consists essentially in the general construction and arrangement of the component parts of the conveying apparatus, all as hereinafter fully described and pointed out in the claims.

In describing this invention, reference is had to the accompanying drawing, forming a part of this specification, in which like letters indicate corresponding parts in all the views.

Fig. 4 is a longitudinal vertical section, partly broken away, taken on line 4—4, Fig. 3.

A B C D are stations for the reception or discharge of the material to be handled by my improved conveying apparatus, and E is a conveyer for connecting said stations which preferably consists of a continuous cylinder revoluble in the direction indicated by arrows 1, Figs. 1, 2, 3, 4, 5, 6, 7, 8, 9, 10, 11 and 12, and is provided with internal feeding means, presently described. It is obvious, however, that said conveyer may consist of independently revoluble sections arranged end to end, as in my pending application, Serial No. 576,031, filed January 18th, 1896. Any suitable means may be used for rotating the conveyer E and I have here shown the inclosing shell of said conveyer as provided with a peripheral gear $e$, which is engaged and driven by a pinion $e^1$, Fig. 1.

Figure 1:
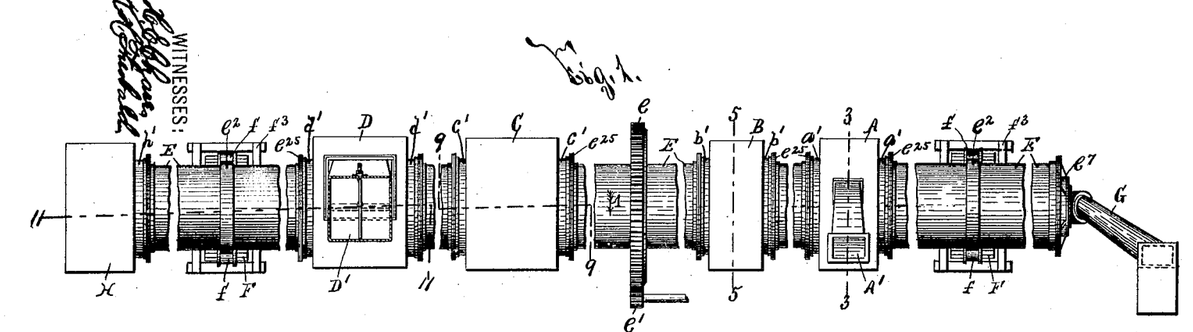
Figures 1 and 2 are respectively, top plan and side elevation, partly broken away, of my improved conveying apparatus.
Figure 2:
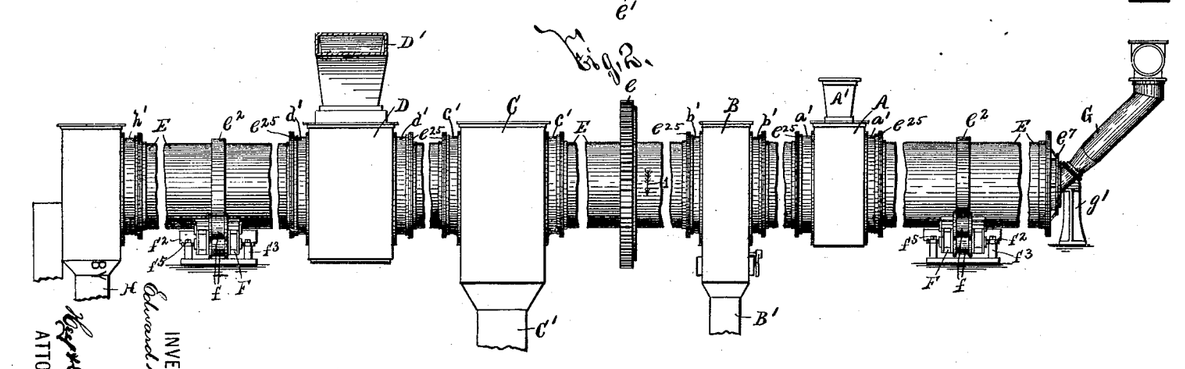
Figure 3:
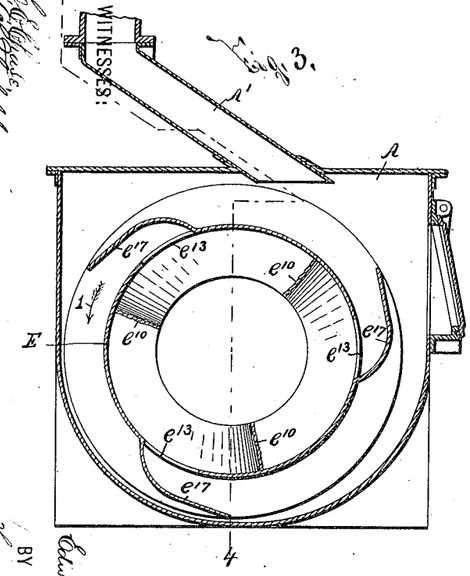
Fig. 3 is an enlarged transverse vertical section, taken on line 3—3, Fig. 1.
Figure 5:
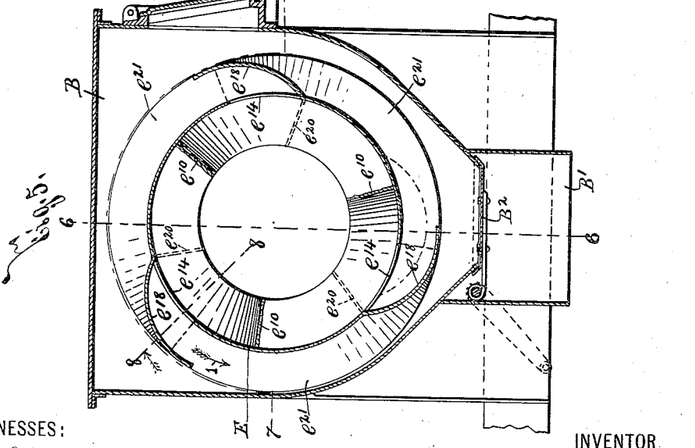
Fig. 5 is an enlarged transverse vertical section, taken on line 5—5, Fig. 1.
Figures 12, 13, 14, 15:
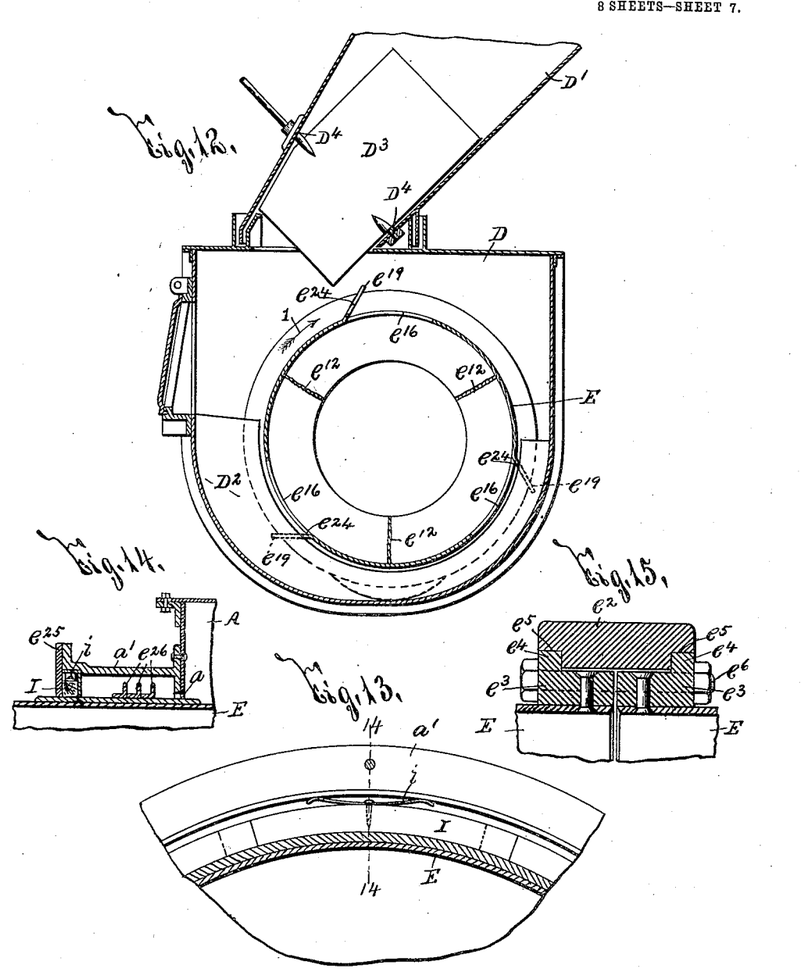
Fig. 12 is a transverse vertical section, taken on line 12—12, Fig. 11.
Fig. 13 is a detail section, taken on line 13—13, Fig. 9.
Figs. 14 and 15 are detail sections taken, respectively, on lines 14—14, Fig. 13, and 15—15, Fig. 10.
Figure 16:
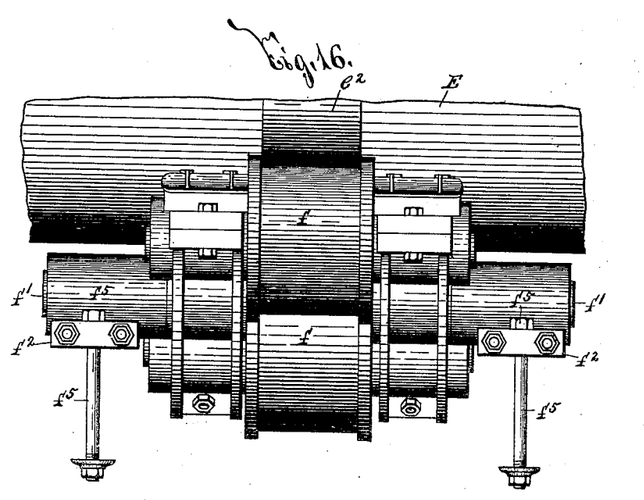
Fig. 16 is an elevation of a detached portion of the conveyer of my improved apparatus and the antifriction rollers for supporting the same.
Figure 17:
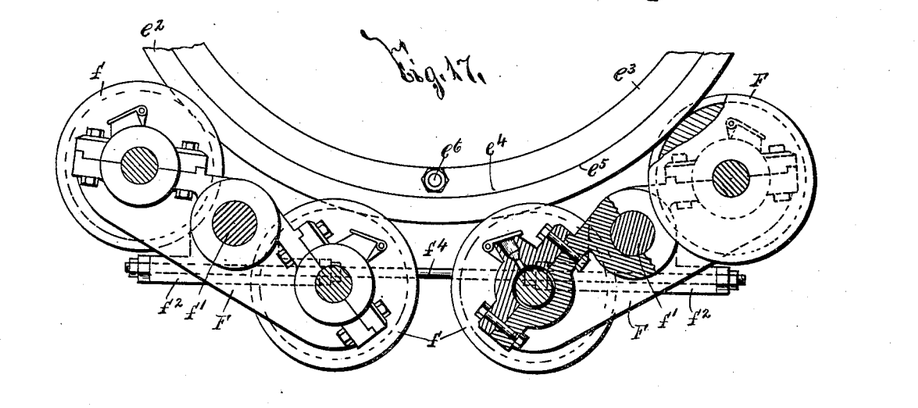
Fig. 17 is a face view, partly in section, of the rollers seen at Fig. 16, the supporting standards for the rollers, and a portion of the tire engaged with the rollers.

In order to reduce to a minimum the friction incidental to the revolution of the conveyer E, tires $e^2$, Figs. 1, 2 and 15 are provided thereon and are engaged by supporting antifriction rollers $f$. The tires $e^2$ may be secured in position in any desired manner but are preferably utilized to unite separate cylindrical sections, Figs. 9 and 15, of which the shell of the conveyer E is usually formed. The adjacent ends of said cylindrical sections are provided with collars or flanges $e^3$ suitably fixed thereto and having their outer peripheral faces provided with annular grooves or recesses for forming projecting shoulders $e^4$, and the inner peripheral faces of the tires $e^2$ are formed with annular grooves or rabbets $e^5$ for receiving and closely fitting the shoulders $e^4$. Suitable clamps as bolts $e^6$ are passed through the collars or flanges $e^3$ and operate to draw together the sections of the conveyer shell and to firmly clamp the tires $e^2$ in position, thereby making a tight joint between said sections and tires.

The antifriction rollers $f$ are arranged in pairs and are mounted in boxes provided upon the opposite extremities of frames or rock-arms F also arranged in pairs beneath the conveyer E and having their intermediate or central portions secured by a shaft or pivot $f^1$ to standards $f^2$ which are mounted on a suitable supporting frame $f^3$. The standards $f^2$ are adjustably connected together by a bolt or rod $f^4$ having its opposite ends screw-threaded and provided with inner and outer securing nuts whereby the frames or rock-arms F for supporting the antifriction rollers $f$ may be adjusted towards and away from each other, to provide a proper bearing for the tire which rests on said rollers. The standards $f^2$ are held in their adjusted position by suitable clamping bolts $f^5$ secured to said standards and the frame $f^3$.

In the exemplification of my improved conveying apparatus, here illustrated, the material to be handled is admitted at one end and at the stations A D from chutes G $A^1$ $D^1$ and is discharged from the opposite end and the stations B C into chutes H $B^1$ $C^1$. It is sometimes desirable to regulate the discharge from the station B, and, consequently, its outlet opening which is usually arranged in its base is provided with a door or closure $B^2$, Figs. 5 and 6, that may be operated by any suitable means. The chute G, Figs. 1 and 4, preferably discharges through an end wall $e^7$, secured to the conveyer E and is formed with a cylindrical flange $g$ which is arranged in a corresponding opening $e^8$ in said end wall. A packing ring $e^9$ preferably encircles the flange $g$ and prevents the escape of the dust and material from the conveyer E, and a suitable standard $g^1$ supports the chute G in position. The chutes $A^1$ $B^1$ $C^1$ $D^1$ H are of any suitable construction and are supported by any desirable means, and one side wall of the chute H is provided with an opening $h$ for receiving the discharge end of the conveyer E, and a projecting chamber or cylindrical stuffing box $h^1$, Fig. 11, which encircles said conveyer and is formed of substantially the same construction as the stuffing boxes, presently described, provided upon the opposite sides of the stations A B C D.
The conveyer E is passed through the opposite side walls of the stations A B C D and is provided with internal feeding means as fixed spirally arranged conveyer-blades $e^{10}$ $e^{11}$ $e^{12}$, openings $e^{13}$ $e^{14}$ $e^{15}$ $e^{16}$ in its inclosing shell communicating with the internal chambers of the stations A B C D and the channels or spaces between the conveyer-blades, and external pockets or scoops $e^{17}$ $e^{18}$ $e^{19}$ movable within the stations A B D. As here illustrated, the number of each of the openings $e^{13}$ $e^{14}$ $e^{15}$ $e^{16}$ formed in the inclosing shell of the conveyer E equals the number of each of the conveyer-blades $e^{10}$ $e^{11}$ $e^{12}$ arranged on the interior of said inclosing shell, but it is obvious that a greater or less number of said openings or conveyer-blades may be used if desired. The conveyer-blades $e^{10}$ extend from the discharge end of the chute G to the openings $e^{15}$ communicating with the interior of the station C and operate to feed to said openings the material admitted from said chute or the station A. The conveyer-blades $e^{11}$ extend from said openings $e^{15}$ to substantially the central portions of the openings $e^{16}$ communicating with the interior of the station D and are inclined in an opposite direction from the conveyer-blades $e^{10}$, for feeding to the station C the material admitted at the station D; and the conveyer-blades $e^{12}$ extend from substantially the central portions of the openings $e^{16}$ to the discharge end of the conveyer E and are inclined in the same direction as the conveyer-blades $e^{10}$ for feeding the material to the chute H.

Figure 6:
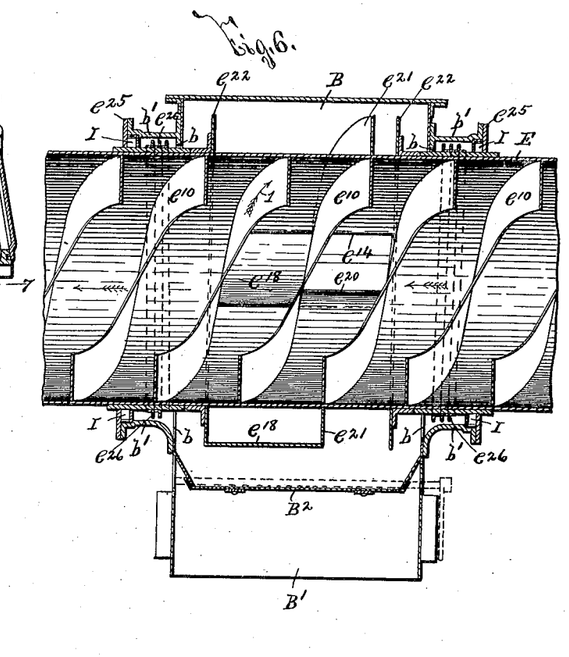
Fig. 6 is a longitudinal vertical section, taken on line 6—6, Fig. 5.
Figure 7:
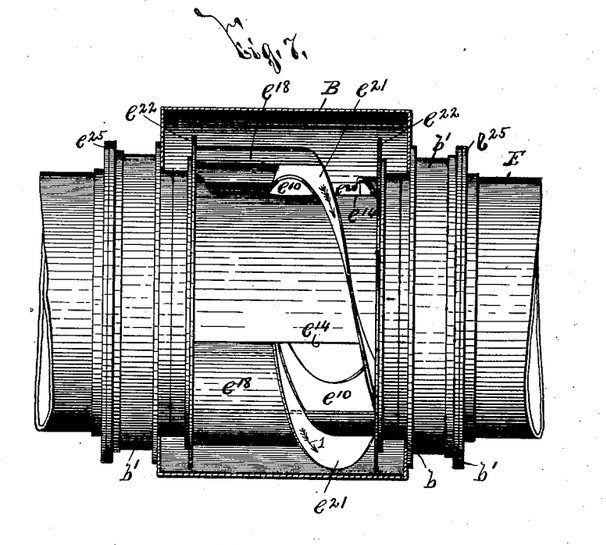
Fig. 7 is a horizontal section, taken on line 7—7, Fig. 5.
Figure 8:
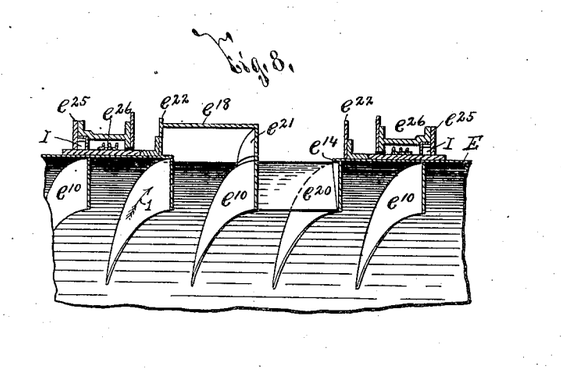
Fig. 8 is a detail section, taken on line 8—8, Fig. 5.
Figure 9:
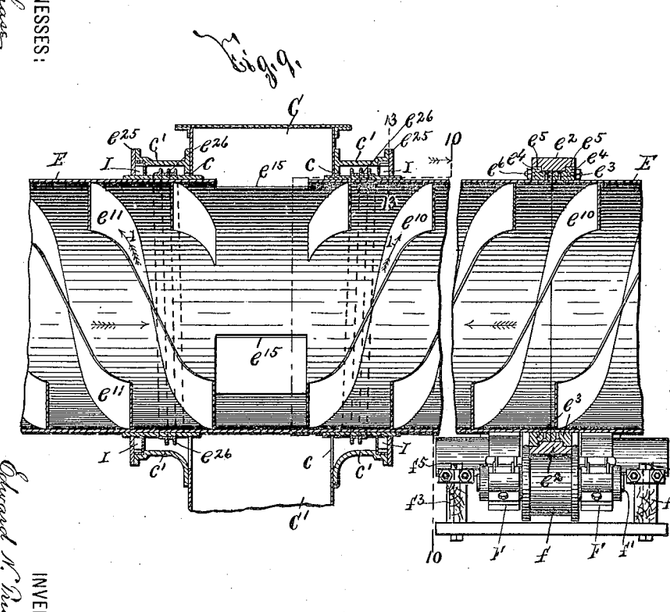
Fig. 9 is a longitudinal vertical section, taken on line 9—9, Fig. 1, a portion of one of the tires for the conveyer of my improved apparatus and the antifriction rollers for supporting the same being illustrated.
Figure 10:
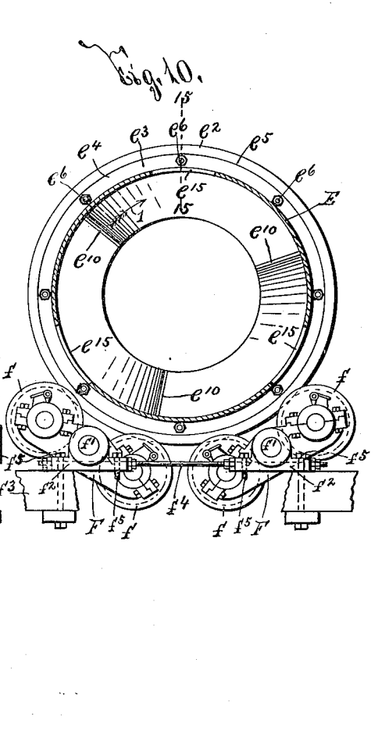
Fig. 10 is a transverse vertical section, taken on line 10—10, Fig. 9, the parts inclosing and provided upon the conveyer being omitted with the exception of one of the tires, and the antifriction rollers for supporting the conveyer being shown in operative position.

The pockets or scoops $e^{17}$ $e^{18}$ $e^{19}$ secured to the exterior of the shell of the conveyer E within the stations A B D incline forwardly from the rear edges of the openings $e^{13}$ $e^{14}$ $e^{16}$ and operate to receive the material at the bases of said stations and to hold and elevate the same for permitting its downward feeding through the openings $e^{13}$ $e^{14}$ $e^{16}$ into the channels or spaces between the conveyer-blades $e^{10}$ $e^{11}$ $e^{12}$. The pockets or scoops $e^{18}$ are only partly as wide as the openings $e^{14}$ for permitting the discharge of the material from the interior of the conveyer E through the portions of said openings extending beyond the pockets or scoops $e^{18}$. This discharge of the material is greatly facilitated by cross bars $e^{20}$ arranged between the conveyer-blades $e^{10}$ and extending inwardly from the rear edges of the openings $e^{14}$. Suitable feeding means as spirally arranged conveyer-blades $e^{21}$, Figs. 6, 7, and 8 are secured to the exterior of the shell of the conveyer E between annular flanges $e^{22}$ upon the exterior of said shell and terminate at the pockets or scoops $e^{18}$ and the flanges $e^{22}$. These external conveyer-blades $e^{21}$ operate to deflect the material in the base of the station B into the pockets or scoops $e^{18}$. It is obvious, however, that when the door or closure $B^2$ of the discharge opening of the station B is partially or entirely open, part or all of said material feeds through said opening and does not remain in the base of the station B to be fed by the pockets or scoops $e^{18}$ into the interior of the conveyer E.

Figure 11:
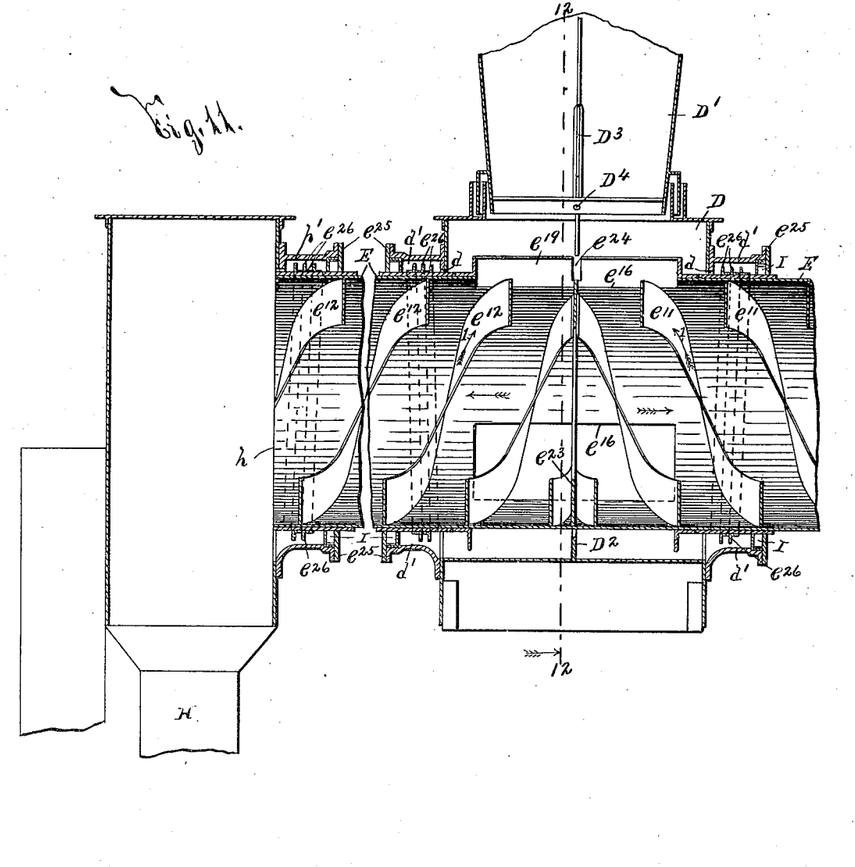
Fig. 11 is a longitudinal vertical section, taken on line 11—11, Fig. 1.

The material discharged by the chute $D^1$ into the station D falls directly into the openings $e^{16}$, Figs. 11 and 12, and, consequently, the pockets or scoops $e^{19}$ extend only partly across said openings and receive and support the material which would otherwise engage the outer peripheral face of the conveyer E and fall downwardly along the same. As previously stated, the conveyer-blades $e^{11}$ $e^{12}$ extend in opposite directions from substantially the central portions of the openings $e^{16}$ and operate to feed the material in opposite directions from said openings. In order to facilitate this operation of said conveyer-blades a suitable flange or shoulder $e^{23}$ projects from the inner peripheral face of the conveyer E between the adjacent ends of the conveyer-blades $e^{11}$ $e^{12}$ which terminate at said flange, and an upright diaphragm $D^2$ is arranged at the base of the station D in alinement with the flange or shoulder $e^{23}$ and partially encircles the conveyer for subdividing the material beneath the same at the base of said station. The pockets or scoops $e^{19}$, previously described, project from the conveyer E beyond the inner edge of the diaphragm $D^2$ and are therefore preferably formed with grooves $e^{24}$ for receiving said diaphragm. Directly above the diaphragm $D^2$ within the chute $D^1$ is a substantially central upright gate $D^3$ which is pivoted at $D^4$, and normally operates to deflect the material from the chute $D^1$ equally to either side of the diaphragm $D^2$. It is obvious, however, that said gate may be inclined for deflecting a greater or less amount of the material to either side of the diaphragm $D^2$ and thereby regulating the amount of material fed in either direction by the conveyer-blades $e^{11}$ $e^{12}$.

The stations A B C D are preferably provided with openings $a$ $b$ $c$ $d$ in their side walls, and projecting chambers or stuffing boxes $a^1$ $b^1$ $c^1$ $d^1$ encircling the conveyer E and extending towards annular flanges $e^{25}$ arranged on the exterior of said conveyer beyond the shells or casings of the stations A B C D and the inner side wall of the chute H. Dust-proof or packing rings I, composed of wood or other suitable material, surround the conveyer E and are arranged in the outer ends of said chambers or stuffing boxes $a^1$ $b^1$ $c^1$ $d^1$ and the stuffing box $h^1$ of the chute H previously described, between the annular flanges $e^{25}$ and the adjacent sides of the inclosing shells or casings of the stations A B C D and the chute H. The rings I preferably consist of sections, Fig. 13, which are arranged with their adjacent ends lapped upon each other and are each provided with springs $i$ for effecting their independent adjustment. I also arrange within the projecting chambers or stuffing boxes $a^1$ $b^1$ $c^1$ $d^1$ $h^1$ suitable means for feeding the material from the packing rings I and the openings $a$ $b$ $c$ $d$ $h$. This means preferably consists of helical flanges or shoulders $e^{26}$ encircling the conveyer E and fixed thereto. The material which tends to pass outwardly from the stations A B C D and the upper end of the chute H through the chambers or stuffing boxes $a^1$ $b^1$ $c^1$ $d^1$ $h^1$ is forced backwardly by these helical flanges or shoulders and is returned to the bases of the stations A B C D and to the chute H through the lower ends of the openings *a b c d h* in the side walls of said chambers and chute.

In the operation of my improved conveying apparatus the chutes A¹ D¹ G may discharge the same or different materials either separately or simultaneously within the conveyer, and said material may be discharged as desired into one or more of the chutes B¹ C¹ H. It will therefore be readily understood that said apparatus is capable of effecting considerable diversity in the feed and movement of the material to be conveyed. The detail construction and arrangement of this apparatus may, however, be considerably varied without departing from the spirit of my invention and hence I do not herein specifically limit myself thereto.

Having thus fully described my invention, what I claim as new and desire to secure by Letters Patent, is:—

1. In a conveyer, a cylinder with means for rotating the same, oppositely-arranged rollers providing bearings for said cylinder, frames for supporting the rollers, and bolts for coupling said frames and for adjusting the same toward and from each other, substantially as described.

2. In a conveying apparatus including a cylinder, and means for rotating the same, frames arranged beneath said cylinder, bearing rollers journaled therein, a bolt for coupling said frames to each other, and nuts arranged upon said bolt exposed beneath said frames for adjusting the relative position of the latter and the rollers journaled therein relative to each other, substantially as described.

3. The combination of a revoluble cylinder provided with recessed peripheral flanges, a tire clamped between said flanges, a bearing for the tire consisting of oppositely arranged rollers, and means for supporting the rollers, substantially as and for the purpose specified.

4. In a conveying machine, the combination with a revoluble cylinder provided with internally arranged fixed spiral conveying blades, and with a tire clamped between recessed flanges on the exterior of the cylinder, a bearing for said tire consisting of rollers arranged in pairs, each pair being mounted in boxes on rock-arms, standards in which is journaled a shaft supporting said rock-arm, and a bolt passed through said standards and provided with inner and outer binding nuts for adjusting the relative positions of the pairs of rollers with respect to said tire.

5. A conveying machine comprising a rotary conveyer provided with internal feeding means and external means for feeding material to said feeding means, substantially as and for the purpose set forth.

6. A conveying machine comprising a rotary conveyer provided with an external peripheral pocket or scoop, and an external conveyer-blade for feeding material to the pocket or scoop, substantially as and for the purpose described.

7. A conveying machine comprising a rotary conveyer provided with an opening in its wall, internal feeding means for feeding material into the opening, and external means for feeding material to said feeding means, substantially as and for the purpose set forth.

8. A conveying machine comprising a rotary cylinder provided with an opening in its wall, a peripheral pocket or scoop for feeding material into the opening, and an external conveyer-blade for feeding material to the pocket or scoop, substantially as and for the purpose specified.

9. A conveying machine comprising a rotary cylinder provided with annular flanges, an opening in its wall between the flanges, a peripheral pocket or scoop for feeding material into the opening, and an external conveyer-blade between the flanges for feeding material to the pocket or scoop, substantially as and for the purpose described.

10. A conveying machine comprising a rotary conveyer provided with means for feeding material to the exterior of the conveyer, and additional means for feeding said material to the interior of the conveyer after its discharge to the exterior of said conveyer by the former means, substantially as and for the purpose specified.

11. A conveying machine comprising a rotary conveyer provided with an outlet-opening in its wall, a pocket or scoop, and external means for feeding to the pocket or scoop the material discharged through the outlet-opening, substantially as and for the purpose set forth.

12. A conveying machine comprising a rotary conveyer provided with outlet and inlet-openings in its wall, a pocket or scoop for feeding material into the inlet-opening, and external means for feeding to the pocket or scoop the material discharged through the outlet-opening, substantially as and for the purpose described.

13. A conveying machine comprising a rotary cylinder provided with annular flanges, outlet and inlet-openings in its wall between the flanges, a pocket or scoop for feeding material into the inlet-opening, and an external conveyer-blade between the flanges for feeding to the pocket or scoop the material discharged through the outlet-opening, substantially as and for the purpose specified.

14. A conveying machine comprising a casing, a rotary cylinder movable within the casing and provided with inlet and outlet-openings in its wall, and means within the casing for feeding into the inlet-opening the material discharged from the outlet-opening, substantially as and for the purpose set forth.

15. In a conveying machine, the combination of a rotary conveyer provided with internal spiral conveyer-blades and external scoops leading to the interior, and external spiral conveyer-blades terminating at said scoops.

16. In a conveying machine, the combination of a revoluble cylinder provided with internal spiral conveyer-blades, and having openings in the sides thereof, one for each blade, scoops for said openings, external spiral conveyer-blades terminating at said scoops and annular flanges adjacent to said scoops and to the other terminations of the external blades.

17. In a conveying machine, the combination of a revoluble cylinder provided with internal spiral conveyer-blades, and openings in its sides one for each passage between the blades, scoops for said openings, external spiral conveyer-blades terminating at said scoops, annular flanges adjacent to said scoops and to the other terminations of the external blades, and a casing surrounding said external blades and flanges, and provided with an opening in its bottom having a closure for controlling the discharge of the material.

In testimony whereof I have hereunto signed my name in the presence of two attesting witnesses, at Syracuse in the county of Onondaga in the State of New York this 11th day of July 1896.

EDWARD N. TRUMP.

Witnesses:
  E. A. WEISBURG,
  K. H. THEOBALD.